(12) United States Patent
Tada et al.

(10) Patent No.: US 7,703,217 B2
(45) Date of Patent: Apr. 27, 2010

(54) DRYING-STORING APPARATUS FOR POWDERED OR GRANULAR MATERIAL AND FEEDING SYSTEM FOR POWDERED OR GRANULAR MATERIAL

(75) Inventors: Hiroshi Tada, Hirakata (JP); Keiji Kimura, Hirakata (JP); Yoshihiko Kuramoto, Hirakata (JP); Shinichi Nakatani, Nagoya (JP)

(73) Assignee: Kabushikikaisha Matsui Seisakusho, Osaka (JP)

( * ) Notice: Subject to any disclaimer, the term of this patent is extended or adjusted under 35 U.S.C. 154(b) by 594 days.

(21) Appl. No.: 10/539,887

(22) PCT Filed: Dec. 18, 2003

(86) PCT No.: PCT/JP03/16221

§ 371 (c)(1),
(2), (4) Date: Dec. 6, 2005

(87) PCT Pub. No.: WO2004/061383

PCT Pub. Date: Jul. 22, 2004

(65) Prior Publication Data

US 2006/0150436 A1    Jul. 13, 2006

(30) Foreign Application Priority Data

Dec. 20, 2002  (JP)  .............................. 2002-369573

(51) Int. Cl.
*F26B 5/04*  (2006.01)

(52) U.S. Cl. ................................ 34/412; 34/377; 34/92
(58) Field of Classification Search .................. None
See application file for complete search history.

(56) References Cited

U.S. PATENT DOCUMENTS

| | | | | |
|---|---|---|---|---|
| 2,073,553 A | * | 3/1937 | Dienst | 34/574 |
| 3,918,168 A | * | 11/1975 | Saeman | 34/377 |
| 4,294,020 A | * | 10/1981 | Evans | 34/168 |
| 4,347,670 A | * | 9/1982 | Wear et al. | 34/263 |
| 5,377,220 A | * | 12/1994 | du Plessis | 438/239 |
| 6,136,976 A | * | 10/2000 | Boehm et al. | 544/314 |

FOREIGN PATENT DOCUMENTS

| | | |
|---|---|---|
| JP | 38-18449 | 9/1963 |
| JP | 63-78707 | 4/1988 |
| JP | 09-292176 | 11/1997 |
| JP | 11-291289 | 10/1999 |
| JP | 2000-127153 | 5/2000 |

\* cited by examiner

*Primary Examiner*—Kenneth B Rinehart
(74) *Attorney, Agent, or Firm*—William L. Androlia; H. Henry Koda (57) ABSTRACT

A drying and storing apparatus for powdered or granular material and a feeding system for powdered or granular material. The apparatus comprises a heating and drying chamber having a discharge port at its lower end and a thermal conductive heating means therein and a hopper chamber connected to the upper end of the heating and drying chamber, in which the heating and drying chamber and the hopper chamber constitute a integrally combined material storage processing tank for powdered or granular material.

21 Claims, 5 Drawing Sheets

DRYING-STORING APPARATUS FOR POWDERED OR GRANULAR MATERIAL AND FEEDING SYSTEM FOR POWDERED OR GRANULAR MATERIAL

TECHNICAL FIELD

The present invention relates to an improvement of an apparatus in which a powdered or granular material such as resin pellet, food grain like rice, oats, red bean, and soy bean, and so on are stored while being dried and of a feeding system of powdered or granular material to a processing equipment using the apparatus.

BACKGROUND ART

In the field of production system of resin mold, generally applied is a system such that a powdered or granular material is supplied to a dryer from a powdered or granular material (thermoplastic resin pellet) tank and the dried powdered or granular material is pneumatically transported to a supply port (material part) of a molding machine. A feeding system is that the thermoplastic resin pellet as a row material is sucked to be transported from a stockyard, is collected in a collector, and is supplied to a heating dryer serving as a service hopper which is directly connected to the material supply port of the molding machine. The reference 1 is Utility Model No. 3058778 registered by the present applicant which discloses a pneumatic, automatic and continuous dehumidifying and drying apparatus of powdered or granular material to be used for the above-mentioned feeding system. According to the apparatus, resin pellet is sequentially fed in a molding machine while being dehumidified and dried, thereby largely improving the efficiency of production system of resin mold.

According to the above-mentioned feeding system, a material feed nozzle is inserted in the resin pellet piled up in a stockyard and the resin pellet is sucked to be transported to the above-mentioned dehumidifying and drying apparatus. Therefore, it is sufficient for the dehumidifying and drying apparatus serving as a service hopper to have a containing capacity for temporally storing the material corresponding to the capacity of molding machine and the capacity of heating means and so on is appropriately determined so as to adequately dehumidify and dry the material while storage.

The resin pellet as a raw material is generally brought in a form of a craft bag per 25 kg unit, a predetermined transportation unit, and it may be efficient to supply it as it is to a feeding apparatus. However, a small molding machine with molding capacity of 1000 g/hr has a drying capacity for about 4 kg, therefore, the above-mentioned dehumidifying and drying apparatus serving as a service hopper does not have such capacity to contain 25 kg of resin pellet at a time. The containing capacity may be correspondingly enlarged, however, the capacity of heating apparatus and so on should be enlarged. Because of the processing capacity (1000 g/hr) of such kind of resin molding machine, it is no need to always heat all of the 25 kg of resin pellet. Therefore, there arises a problem such that heating incurs waste, the apparatus becomes expensive and its running cost becomes high.

DISCLOSURE OF THE INVENTION

The present invention is proposed considering the above-mentioned problems, the disposal capacity of processing apparatus like a molding machine and a heating and drying efficiency. The present invention provides a new drying and storing apparatus of a powdered or granular material and feeding system of a powdered or granular material which improve the production efficiency and process system of a powdered or granular material.

According to claim 1 of the present invention, the drying and storing apparatus for powdered or granular material comprises a heating and drying chamber having at its lower end a discharge port and therein a thermal conductive heating means, and a hopper chamber connected to the upper end of the heating and drying chamber. The heating and drying chamber and the hopper chamber constitutes a integrally combined material storage processing tank for powdered or granular material.

According to the construction, a relatively large amount of powdered or granular material, like 25 kg of resin pellet contained in a craft bag, a predetermined transportation unit, can be supplied at a time in the powdered or granular material storage tank formed such that the heating and drying chamber and the hopper chamber are integrally connected vertically. The corresponding amount of powdered or granular material to the capacity of processing apparatus like a molding machine is heated and dried in the lower heating and drying chamber and the dried powdered or granular material is sequentially fed to the processing machine from the discharge port at the lower end. In case that the powdered or granular material storage tank has airtight construction and is capable of being depressurized in its inner by means of a decompression means (claim 2), the moisture evaporated by means of the thermal conductive heating means is sequentially discharged outside and the storage tank is always kept in a drying atmosphere.

The thermal conductive heating means is preferably comprised of a heating source and a thermal conduction means through which the heat generated from the heating source is conducted into the powdered or granular material stored in the heating and drying means (claim 3). More preferably, the thermal conductive heating means is comprised of an outer tube unit and/or an inner tube unit. The outer tube unit is comprised of a tube wall, a first heater as a heating source provided in the tube wall, and plural fins as a thermal conduction means projected from the inside of the tube wall into the center and are spaced in a circumferential direction. The inner tube unit is comprised of a pillar body hung at the center of the outer tube unit, a second heater as a heating source embedded in the pillar body, and plural fins as a thermal conduction means radially projected from the pillar body (claim 4). The tube wall and fins of the outer tube unit and the pillar body and fins of the inner tube unit of the thermal conductive heating means are preferably made of a highly heat conductive metal (for example, aluminum) (claim 5). The first heater and the second heater may be an electric heating type or a microwave type.

By adopting such a thermal conductive heating method, the heat generated from the heater provided in the tube wall or embedded in the pillar body is uniformly transferred to the powdered or granular material like resin pellet stored in the heating and drying chamber through the inside of the tube wall and the plural fins, thereby efficiently drying the powdered or granular material. A local overheating is not generated for the powdered or granular material, so that there is no fear the powdered or granular material is partially dissolved in the heating and drying chamber.

A rectifier is formed at the lower end of the pillar body in such a manner that the lower diameter is downwardly enlarged (like a circular cone or a plug) (claim 6). When the powdered or granular material is discharged from the discharge port, a first-in and first-out system is kept because of the rectifier and the powdered or granular material which is not dried is not discharged from the port.

An open-close cover is provided at the upper end of the hopper chamber and the powdered or granular material is fed into the storage processing tank during the cover is opened (claim 7). A charge hopper may be provided above the opening of the cover via a discharge valve (claim 8). A user may select it according to his demand. It is desirable that a carrier gas introduction means by which a carrier gas is introduced into the storage processing tank is further provided at the material storage processing tank (claim 9). The carrier gas introduction means, in addition to the function of the decompression means, contributes a rapid discharge of the vapor and other volatile substance generated in the storage tank accompanied with heating.

According to claim 10 of the present invention, the feeding system of powdered or granular material using the drying and storing apparatus for powdered or granular material as set forth in any one of claim 1-9 comprises a feeder unit provided at the lower discharge port of the drying and storing apparatus, a pneumatic transportation means connected to the feeder unit through which a powdered or granular material dried in the drying and storing apparatus is transported into a collector connected at the end of the pneumatic transportation means while being discharged from the discharge port, whereby the powdered or granular material collected in the collector is fed into a processing apparatus for powdered or granular material.

Further according to the present invention, the feeder unit is connected with a circulation pipe connected to the drying and storing apparatus through which a powdered or granular material discharged from the drying and storing apparatus is pneumatically circularly transported so as to return to the drying and storing apparatus (claim 11). Still further, the feeding system of the present invention is preferably applied to the case in that the processing apparatus of powdered or granular material is a resin molding machine and the powdered or granular material is resin pellet (claim 12)

BRIEF DESCRIPTION OF DRAWINGS

FIG. 3b is a longitudinal sectional view taken along line Y-Y in FIG. 3a.

FIG. 4a is a partial sectional front view of a feeder unit and FIG. 4b is a sectional view along line Z-Z in FIG. 4a.

BEST MODE FOR CARRYING OUT THE INVENTION

Figure 1:
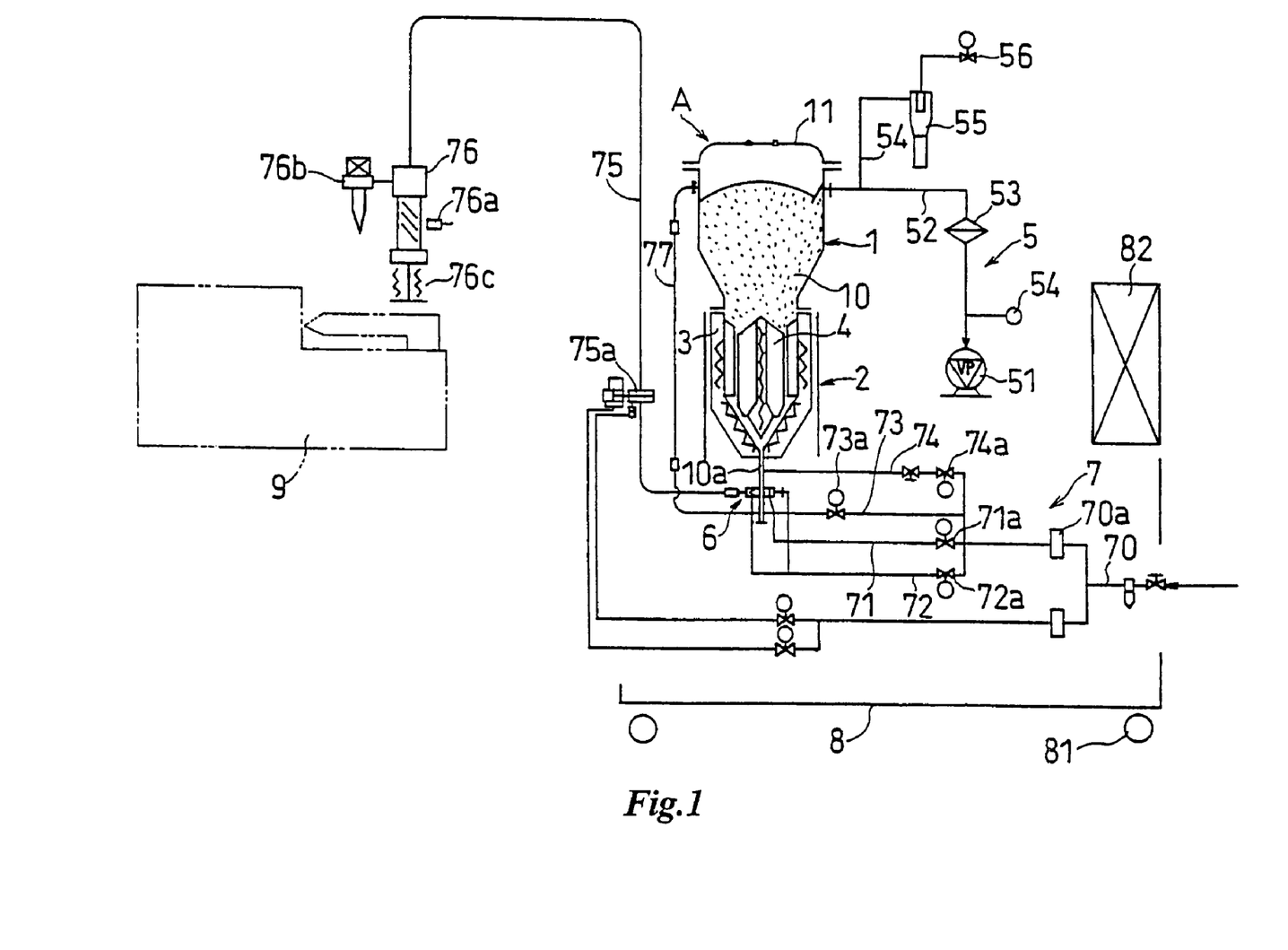
FIG. 1 shows a diagrammatical entire view of one embodiment of a powdered or granular material feeding system of the present invention.
Figure 2:
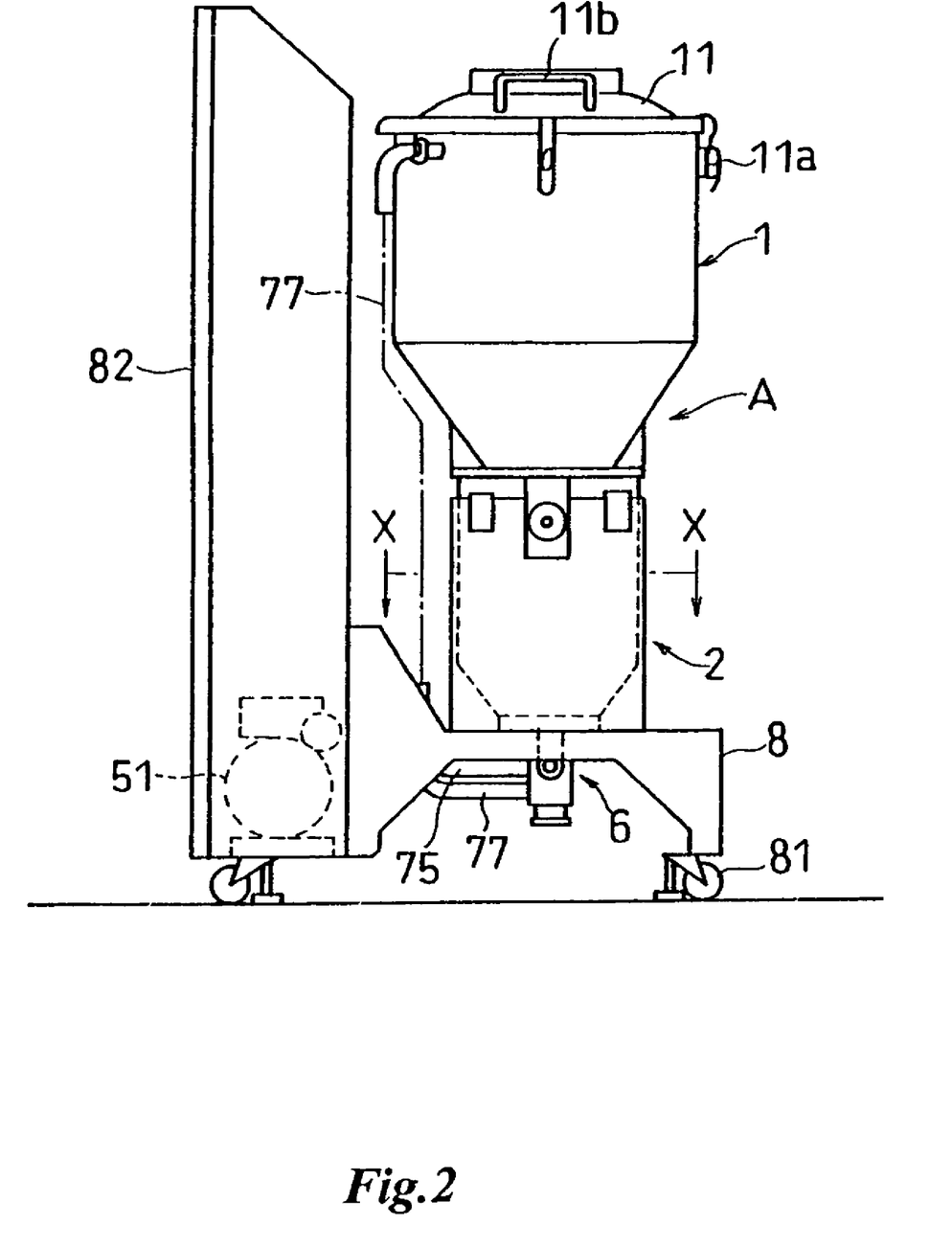
FIG. 2 is an external side view of a drying and storing apparatus of powdered or granular material applicable to the system.
Figure 3A:
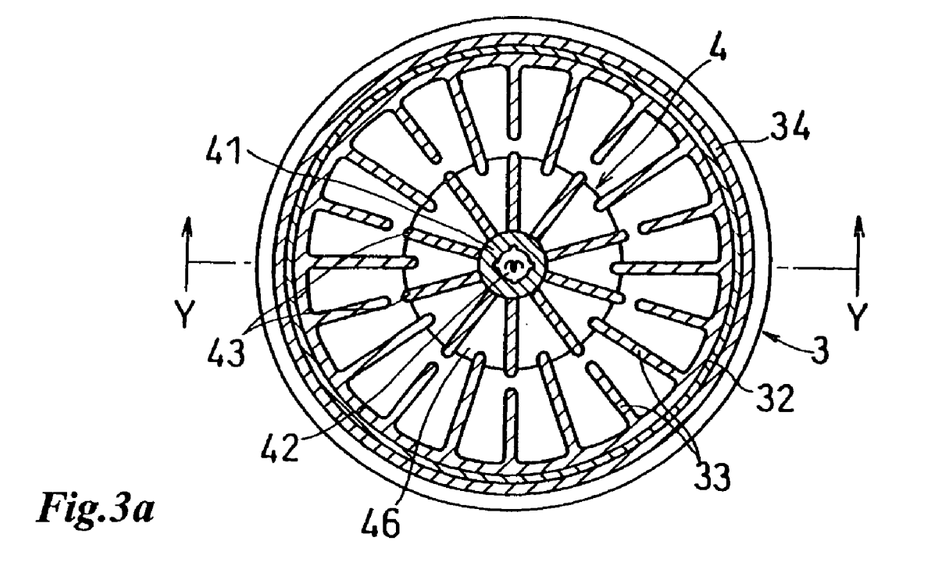
FIG. 3a is a cross-sectional view taken along line X-X in FIG. 2.
Figure 3B:
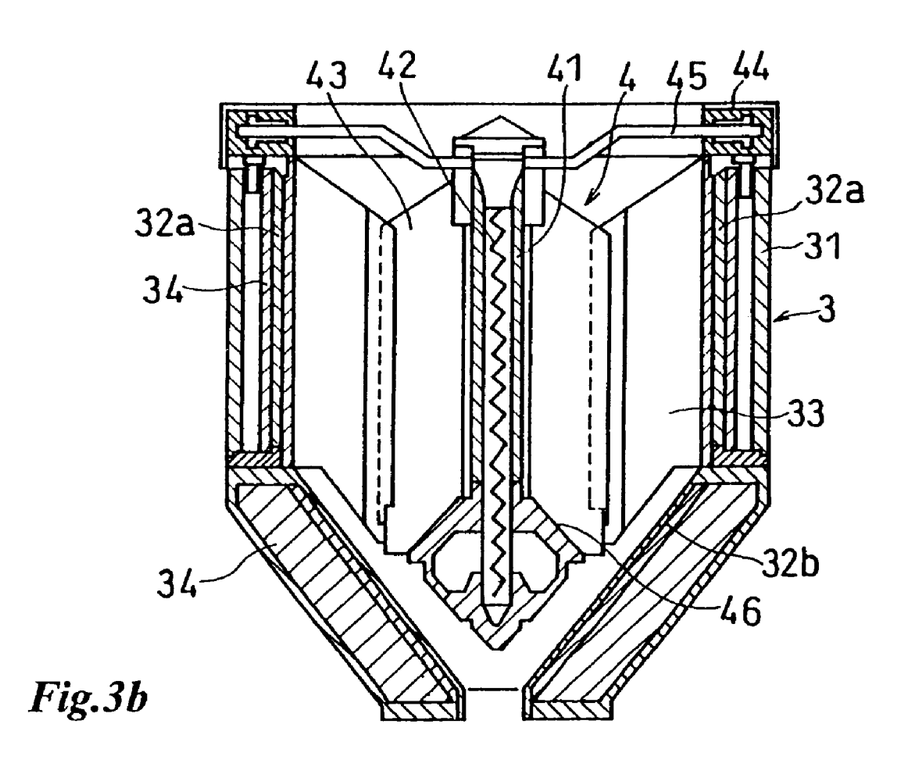

The embodiments of the present invention are explained referring to the attached drawings. FIG. 1 shows a diagrammatical entire view of one embodiment of a powdered or granular material feeding system of the present invention. FIG. 2 is an external side view of a drying and storing apparatus of powdered or granular material applicable to the system. FIG. 3a is a cross-sectional view taken along line X-X in FIG. 2 and FIG. 3b is a longitudinal sectional view taken along line Y-Y in FIG. 3a. The reference numeral A shows a drying and storing apparatus of powdered or granular material and is comprised of a hopper chamber 1 and a heating and drying chamber 2 connected thereunder. The hopper chamber 1 has a larger inside capacity than the heating and drying chamber 2 and they are integrally connected up and down by means of a jig like an adjust fastener or bolt and nut via a packing (not shown), so that an airtight integrally combined material storage processing tank 10 for powdered or granular material is formed therein. A tubular discharge port 10a is provided at the lower end of the storage tank 10.

The upper end of the hopper chamber 1 is largely opened and an open-close cover 11 is airtightly fixed by means of an adjust fastener 11a via a packing (not shown). When a powdered or granular material is fed in the storage tank 10 for powdered or granular material, the adjust fastener 11a is released and the cover 11 is held up with a hand hold 11b to be opened. Resin pellet of 25 kg unit contained in a craft bag, as mentioned before, is supplied at a time from the opening.

The heating and drying chamber 2 includes a thermal conductive heating means comprising an outer tube unit 3 and an inner tube unit 4. The outer tube unit 3 has first heaters 32a, 32b, as a heating source, provided inside of a tubular wall 31 with a lower conical portion and plural fins 33 . . . , as a thermal conduction means, radially projecting from the inside of the wall 31 into the center with a space. The inner tube unit 4 has a pillar body 41 which embeds a second heater 42, as a heating means, is hung at the center of the outer unit 3, and projects plural fins 43 as a thermal conduction means. The inner tube unit 4 is supported at the center by means of a hanger arm 45 like a spoke horizontally extending from a support ring 44 like a flange into a centripetal direction and the support ring 44 is laid on the upper end of the outer tube unit 3, so that the inner tube unit 4 can be concentrically hung in the outer tube unit 3. A rectifier 46 is formed at the lower end of the pillar body 41 and its diameter is downwardly enlarged (like a circular cone or a column).

A silicon rubber heater is used as first heaters 32a, 32b and is attached along the tube wall 31 with an insulation layer 34 at its outside. The second heater 42 is embedded in the pillar body 41 of the inner tube unit 4. Wires for the second heater 42 are introduced outside via the hanger arm 45 and are connected to an electric source with wires for the first heater 32. The tube wall 31 and fins 33 of the outer tube unit 3 and the pillar body 41 and fins 43 . . . of the inner tube unit 4 are made of a highly heat conductive metal like aluminum, thereby constituting the thermal conduction means. The upper end of each fin 33 . . . of the outer unit 3 is cut so as to be inclined downwardly into the center and the upper end of each fin 43 of the inner tube unit 4 is cut so as to be inclined outwardly, so that a powdered or granular material does not stay at the upper part.

In thus constructed heating and drying chamber 2, the powdered or granular material supplied in the hopper chamber 1 enters in each space divided by the tube wall 31 and the fins 33 . . . of the outer tube unit 3 and the pillar body 41 and the fins 43 . . . of the inner tube unit 4 to be stored therein. When the first heaters 32 (a, b) and the second heater 42 are turned on, the heat is conducted to the powdered or granular material staying in such divided spaces via the above-mentioned thermal conduction means, thereby heating the material. This thermal conductivity is so extremely efficient that the moisture attached on the surface of powdered or granular material is evaporated and the powdered or granular material is heated into the temperature suitable for a process mentioned later (molding process).

A fixed amount of heated and dried powdered or granular material is discharged from the discharge port 10a and is fed to a molding machine as a processing apparatus via a feeder unit, which is mentioned later. The same amount of powdered or granular material as is discharged falls from the hopper chamber 1 into the heating and drying chamber 2 by its gravity and the above-mentioned heating and drying are repeated. The rectifier 46 mentioned above is formed at the lower end of the pillar body 41 and ensures a first-in and first-out system when a powdered or granular material is discharged and dropped by its gravity, so that the powdered or granular material which has not been heated or dried yet can not be discharged at first. The thermal conductive heating means is not limited to one shown in the figure, however, it may be comprised of only the outer tube unit 4, or plural thermal conductive heating means like a column with a heating source and a thermal conduction means may be provided in the heating and drying chamber 2.

The drying and storing apparatus A of the embodiment of the present invention is equipped with a decompression means 5 capable of vacuumizing and depressurizing the storage tank 10 for powdered or granular material. The reference numeral 51 is a vacuum pump in FIG. 1 and is connected to the storage tank 10 via a pipe 52. A filter 53 is provided for the pipe 52 to remove dust generated in the storage tank 10. The reference numeral 54 is a pressure gauge to observe clogging in the filter 53. A bypass pipe 54 is further diverged from the pipe 52 and is connected to an open valve 56 via a cyclone 55.

When the vacuum pump 51 is operated, the storage tank 10 of powdered or granular material is vacuumized and depressurized and the vapor generated by the thermal conductive heating means in the heating and drying chamber 2 is discharged out of the apparatus. When the pressure in the storage tank 10 is required to be returned to the atmospheric pressure in order to discharge the powdered or granular material in the storage tank 10 from the discharge port 10a, the vacuum pump 51 is stopped and the open valve 56 is opened, thereby introducing the outer air in the storage tank 10 through the open valve 56. Also, the storage tank 10 may be returned to the atmospheric pressure by introducing a dry air from a purge line, mentioned later, so that an outer moist air can be prevented from entering.

The drying and storing apparatus A may be directly connected on an injection or extrusion resin molding machine 9 as a processing machine of powdered or granular material mentioned later to directly supply resin pellet in the storage tank 10 into the supply port of the molding machine 9. In FIG. 1, the apparatus is used for a feeding system of resin pellet by means of a pneumatic transportation means. A feeder unit 6 is attached to the discharge port 10a at the lower end of the storage tank 10 of powdered or granular material and is connected with a pneumatic transportation means 7 to feed pellet resin in the storage tank 10 into the molding machine 9.

Figure 4A:
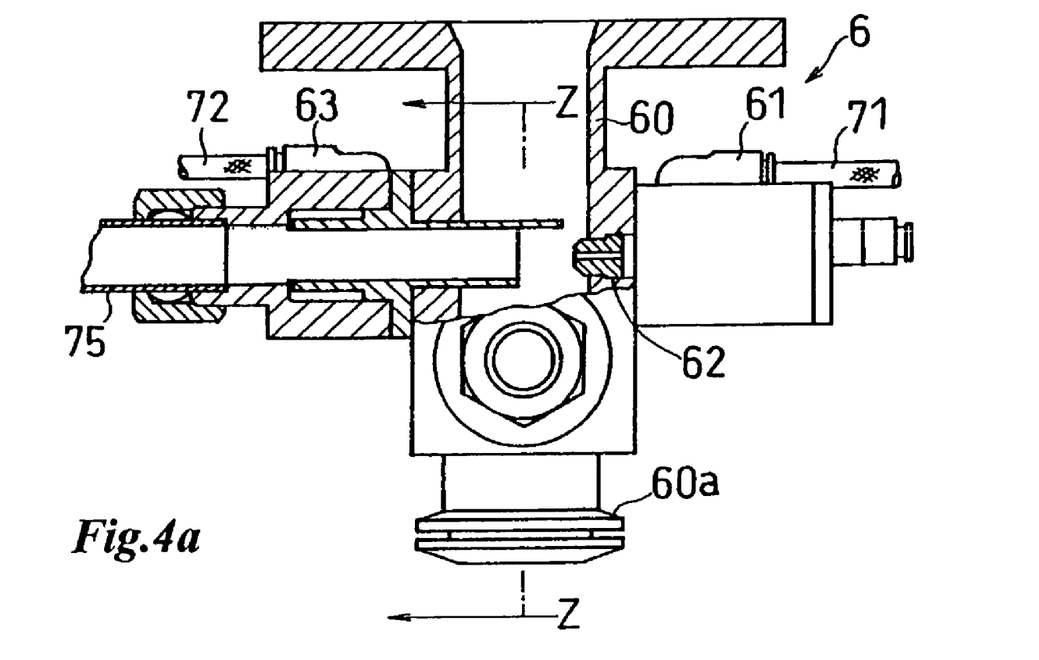
Figure 4B:
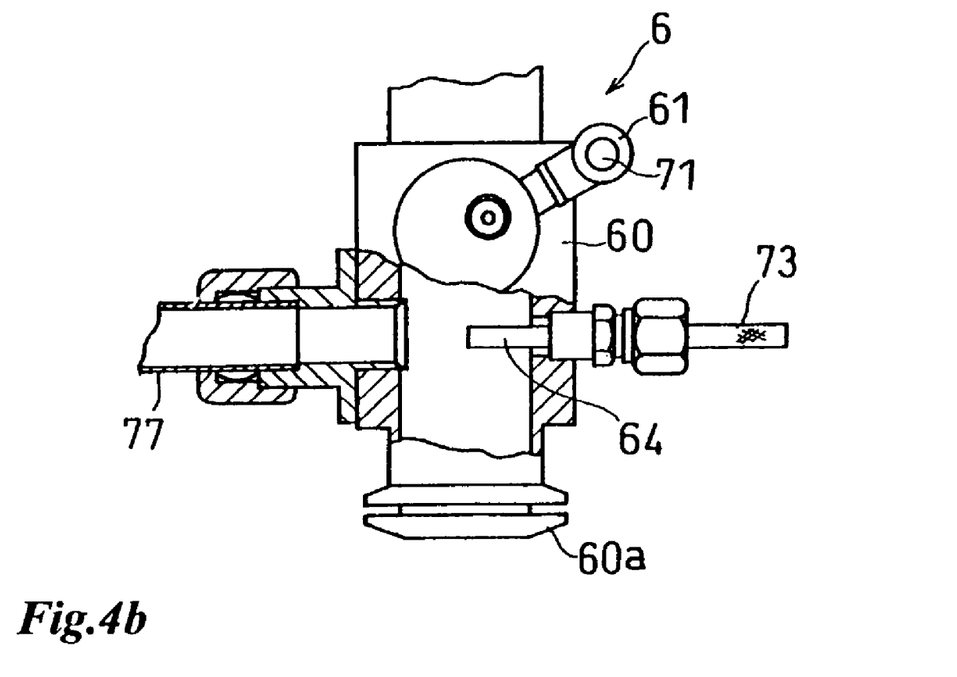

FIG. 4a is a partial sectional front view of the feeder unit 6 and FIG. 4b is a sectional view along line Z-Z in FIG. 4a. As shown in FIG. 1, a main compressed air supply line 70 is connected to a compressor, not shown, and is diverged into a transportation line 71, a blow line 72, a circulation line 73 and a purge line 74. An electromagnetic valve 71a, 72a, 73a, 74a is provided for the transportation line 71, the blow line 72, the circulation line 73 and the purge line 74, respectively.

The transportation line 71 is connected to a connector 61 for transportation line attached to the feeder unit 6 and the pressurized air introduced through the connector 61 is discharged from a nozzle 62 facing a tubular body 60 of the feeder unit 6. The tubular body 60 is connected to the discharge port 10a of the lower end of the storage tank 10 and a pneumatic transportation line 75 is connected to the tubular body 60 opposite to the nozzle 62. A connector 63 for blow line directing to the feeding direction in the pneumatic transportation line 75 is attached to the feeder unit 6 to which the pneumatic transportation line 75 is connected. The blow line 72 is connected to the connector 63 for blow line. A valve 60a for discharging a residual material is provided at the lower end of the tubular body 60 and is always closed.

A collector 76, which is positioned above the supply port of the molding machine 9, is connected to the end of the pneumatic transportation line 75 and a discharge valve 75a is provided to open and close the pneumatic transportation line 75. The reference numeral 75b refers to an air pipe for operating the discharge valve 75a. The reference numeral 76a is a level gauge for detecting the accumulated amount of resin pellet in the collector 76. A capacitance type or light permeable type level gauge is used as the level gauge 76a. The reference numeral 76b indicates a filter unit to remove dust in a transportation air and to discharge a clean air outside. It is preferable that a heating means 76c is provided between the collector 76 and the molding machine 9, as shown in the figure, to heat again a pellet resin suitable for molding depending on the kinds of resin or in case that the temperature of resin pellet is reduced during transportation.

Now, the feeding and supplying method of dried resin pellet from the drying and storing apparatus A into a molding machine 9 by means of the above-mentioned pneumatic transportation means 7 will be explained hereinafter. The resin pellet per a unit of 25 kg is supplied in the material storage tank 10 of the drying and storing apparatus A. The discharge valve 75a, the electromagnetic valves 71a, 72a, 73a, 74a, and the valve 60a for discharging a residual material are closed, and the storage tank 10 is airtightly kept. The decompression means 5 is operated and the first and second heaters 32, 42 of the heating and drying chamber 2 are also turned on, thereby keeping to heat and dry the resin pellet in the heating and drying chamber 2 and keeping the storage tank being decompressed and vaccumized. Under such circumference, the vapor generated from the surface of resin pellet is sequentially discharged by means of a decompression means 5.

The molding machine 9 sequentially molds and process resin into a predetermined shape while falling pellet resin from the collector 76 and the accumulated amount of resin pellet in the collector 76 is observed by the level gauge 76a. When the level gauge 76a detects the amount becomes lower than a predetermined level, the decompression means 5 is stopped, the open valve 56 is released, and the storage tank 10 becomes at an atmospheric pressure. When the discharge valve 75a is opened and the electromagnetic valve 71a of the transportation line 71 is opened, the resin pellet heated and dried in the heating and drying chamber 2 falls by its gravity in the tubular body 60 of the feeder unit 6 through the discharge port 10a and is sucked in the pneumatic transportation line 75 because of a local negative pressure phenomenon accompanied with the action of discharged air from the nozzle 62. Then, by means of the compression feeding action of the discharged air from the nozzle 62, the resin pellet is fed in the air transport pipe 75 to be collected in the collector 76.

While keeping the above-mentioned material supply sequentially, and when the level gauge 76a detects the material reaches a predetermined level, the electromagnetic valve 71a of the transportation line 71 is closed, and pneumatic transportation of resin pellet by the discharged air from the nozzle 62 is stopped. In such a case, the resin pellet remains in the pneumatic transportation line 75, so that the electromagnetic valve 72a of the blow line 72 is immediately opened, a compressed air is introduced and discharged into the inlet of the pneumatic transportation line 75 from the connector 63 for blow line, and the resin pellet remained in the pneumatic transportation line 75 is pneumatically transported into the collector 76.

After completing transportation of resin pellet in the pneumatic transportation line 75, the discharge valve 75a and the electromagnetic valve 72a of the blow line 72 are closed. Then the open valve 56 is closed and the decompression means 5 is operated at the same time to make the storage tank 10 depressurized and vacuum. After material discharge from the discharge port 10a, resin pellet newly fallen by the gravity in the heating and drying chamber 2 from the hopper chamber 1 is heated and dried.

During heating and drying, a carrier gas is introduced in the storage tank 10 if necessary in order to accelerate discharge of vapor. Namely, the purge line 74 is connected near the discharge port 10a, and when its electromagnetic valve 74a is opened, a compressed air from a compressor is introduced in the storage tank 10 from the discharge port 10a. When a compressed air is switched to transmit a hollow fiber filter 70a of the main compressed air supply line 70, only a nitrogen gas in the compressed air is separated and fed. The separated nitrogen gas passes through the accumulation layer of resin pellet in the storage tank 10 as a carrier gas and discharge of vapor is accelerated. It goes without saying that the feeding amount of compressed air by the purge line 74 is set so as to keep the storage tank 10 depressurized.

Sometimes resin pellet is required to be circulated during processing resin mold. For example, when some materials are still stayed more than a predetermined time during heating and drying, bridging phenomenon may be caused. In order to prevent such phenomenon, the material is forcibly circulated to keep moving while staying still more than a predetermined time. In FIG. 4b the circulation line 73 is introduced under the tubular body 60 of the feeder unit 6 so as to discharge a compressed air from the nozzle 64 connected to the circulation line 73. A circulation pipe 77 is connected at the opposite side of the nozzle 64 and its end is introduced at the upper part of the storage tank 10.

When resin pellet is circulated into the storage tank 10 by means of the above-mentioned circulation system, the decompression means 5 is stopped at first and the open valve 56 is released to make the storage tank 10 atmospheric pressure. Then the electromagnetic valve 73a of the circulation line 73 is opened to discharge a compressed air from the nozzle 64. By discharging compressed air, resin pellet fallen by the gravity in the tubular body 60 is pneumatically transported in the circulation pipe 77, like in the nozzle 62, to be fed and circulated in the storage tank 10. Because a compressed air is introduced in the storage tank 10, the storage tank 10 becomes a positive pressure and extra air is sequentially discharged outside from the open valve 56. Dust is included in the discharged air, however, dust is removed by the cyclone 55 and a clean air is discharged from the discharge valve 56.

The drying and storing apparatus A and its associating equipment are mounted on a cart 8 with casters 81. The apparatus itself becomes very compact and an operator can move it into a desired place of a production line. The main compressed air supply line 70 is connected to a compressed air supply port of a compressor, and the pneumatic transportation line 75 is connected to the collector 76 above the molding machine 9, thus feeding resin pellet. The reference numeral 82 indicates a control board to execute the above-mentioned operations.

Figure 5:
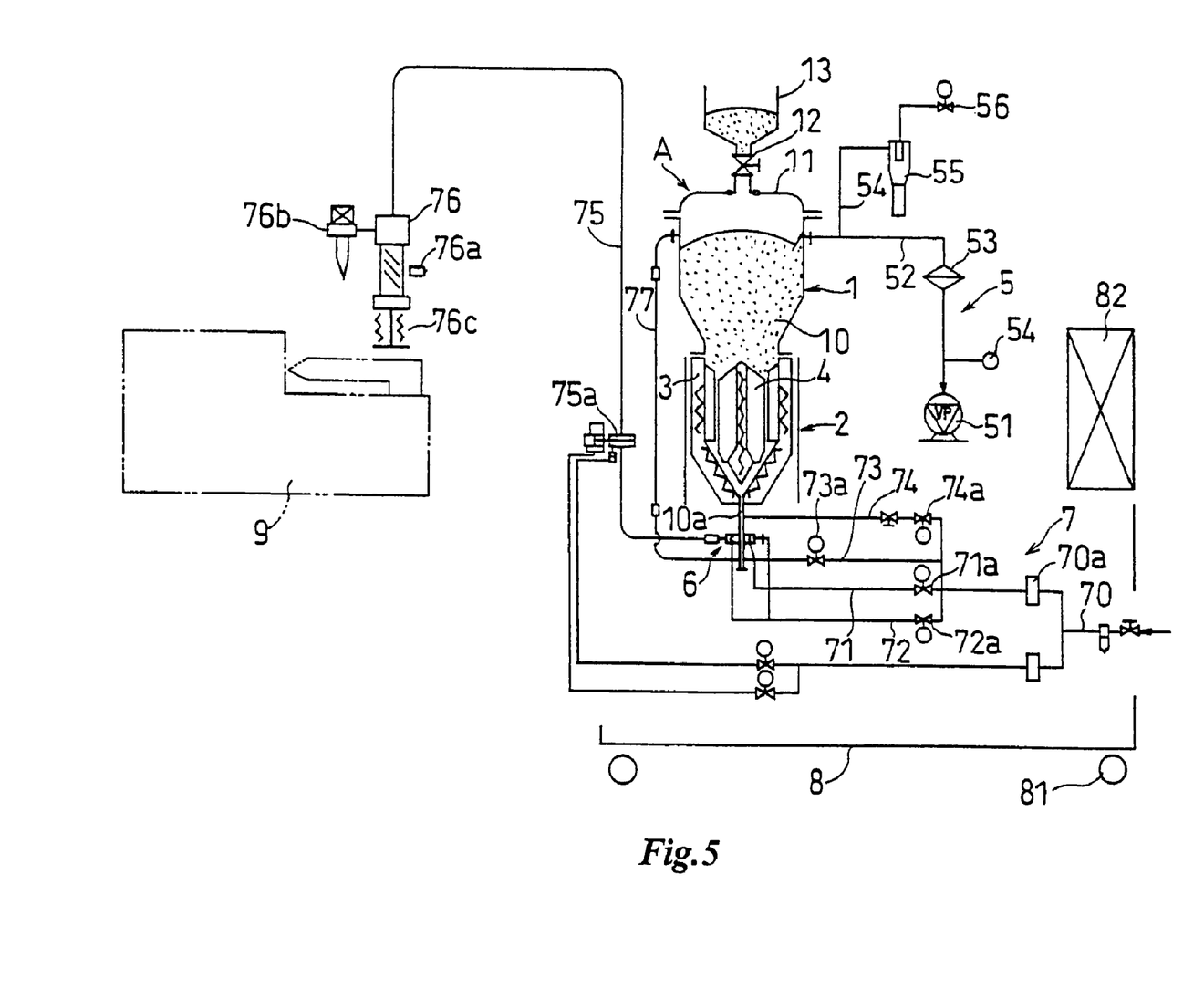
FIG. 5 shows a diagrammatical entire view of another embodiment of a powdered or granular material feeding system of the present invention.

FIG. 5 shows another embodiment of the present invention. A part of the upper end of the open-close cover 11 of the first embodiment is opened and a charge hopper (service hopper) 13 is further provided at the opening via a discharge valve 12. In this embodiment, resin pellet is fed in the charge hopper 13, the discharge valve 12 is opened by hands, and the resin pellet in the charge hopper 13 is fed by the gravity into the hopper chamber 1. Unlike the first embodiment, the adjust fastener 11a is not operated and the heavy cover 11 is not lifted, so that material can be fed easily. In case of feeding resin pellet by means of the charge hopper 13, the cover 11 is preferably provided forte maintenance of the tank, however, the discharge valve 12 and the charge hopper 13 may be provided for the hopper chamber without the cover 11. Other constructions are the same as those of the first embodiment and the same members have the same reference numerals to omit their explanation.

It goes without saying that the decompression means 5 is stopped and the open valve 56 is released to make the storage tank 10 atmospheric pressure when resin pellet is fed by opening the cover 11 or by means of the charge hopper 13. Material is pneumatically transported by a compressed air in the above-mentioned embodiments, however, a pneumatic transportation by suction air may not be excluded. Also, the above-mentioned embodiments refer to a storing, drying and feeding system of resin pellet, however, the present invention is preferably adopted in a storing, drying and feeding system of other powdered or granular material like food grain such as rice, oats, red bean, and soy bean, and so on.

EFFECT OF THE INVENTION

As mentioned above, according to the drying and storing apparatus of powdered or granular material as set forth in claim 1 of the present invention, a relatively large amount of powdered or granular material, like 25 kg of resin pellet contained in a craft bag, a predetermined transportation unit, can be supplied at a time in the powdered or granular material storage tank formed such that the heating and drying chamber and the hopper chamber are integrally connected vertically. The corresponding amount of powdered or granular material to the capacity of processing apparatus like a molding machine is heated and dried in the lower heating and drying chamber and the dried powdered or granular material is sequentially fed to the processing machine from the discharge port at the lower end. Therefore, operational efficiency is achieved and there causes no waste of energy in the heating and drying chamber.

According to claim 2 of the present invention, the powdered or granular material storage tank is airtightly constructed and is capable of being depressurized by a decompression means, the moisture evaporated by means of the thermal conductive heating means is sequentially discharged outside and the storage tank is always kept in a drying atmosphere. Further, the thermal conductive heating means is constructed according to claims 3-5, the heat generated from the heater provided inside or embedded in the heat generated by the heaters is uniformly transferred to the powdered or granular material like resin pellet stored in the heating and drying chamber via the tube wall and numeral fins, thereby efficiently drying the powdered or granular material. The powdered or granular material is not locally overheated, so that the powdered or granular material has no fear of partially dissolving in the heating and drying chamber.

The heating and drying chamber has the rectifier as set forth in claim 6, so that the first-in and first-out system can be kept when a powdered or granular material is discharged from the discharge port, and the material which has not yet been dried is not discharged. Therefore, a suitable amount of powdered or granular material for the capacity of processing machine like a molding machine can be continuously heated and dried and a large heating means is not necessary, thereby contributing energy saving.

The open-close cover is provided at the upper end of the hopper chamber like claim 7 or the upper surface of the cover is opened and the charge hopper is further provided above the opening via the discharge valve as mentioned in claim 8. A relatively large amount of one transportation unit of powdered or granular material in a craft bag, for example 25 kg, can be fed at once by hands, thereby facilitating the operation. When a carrier gas introduction means is provided as set forth in claim 9, the vapor in the storage tank generated by heating can be accelerated to be rapidly discharged in addition to the function of decompression means.

According to the feeding system of powdered or granular material as set forth in claims 10-12, a powdered or granular material like resin pallet is heated and dried efficiently and material supply which is suitable for the capacity of processing apparatus like the molding machine is systematically executed, thereby being rational and largely contributing efficient production process of molding material.

INDUSTRIAL APPLICABILITY

In the field of manufacturing resin molds with resin pellet and so on, energy saving and productive efficiency are achieved.

The invention claimed is:

1. A drying and storing apparatus for powdered or granular material, comprising:
   a material storage processing tank including a heating and drying chamber having at its lower end a discharge port and therein a thermal conductive heating means, and a hopper chamber connected to the upper end of said heating and drying chamber for storing therein a powdered or granular material to be heated and dried, said thermal conductive heating means comprising an outer tube unit having a first heater provided in a tube wall and a plurality of fins for conducting the heat of said first heater projected from the inside of said tube wall into the center and spaced in its circumferential direction,
   a decompression means for depressurizing the inside of said material storage processing tank, and
   a feeder unit provided at said discharge port and connected to a pneumatic transportation means, wherein
   said material storage processing tank is formed by integrally connecting said hopper chamber and said heating and drying chamber and has an airtight means, and said hopper chamber is designed to be larger in capacity than said heating and drying chamber, wherein,
   said feeder unit is connected to
      a transportation line and a circulation line both of which are diverged from a main line constituting said pneumatic transportation means,
      a pneumatic transportation pipe, provided corresponding to said transportation line, for supplying the powdered or granular material discharged through said discharge port to a processing apparatus of powdered or granular material, and
      a circulation pipe, provided corresponding to said circulation line, for supplying the powdered or granular material discharged through said discharge port to the upper part in said hopper chamber, and wherein
   the powdered or granular material stored in said material storage processing tank is heated and dried by said thermal conductive heating means while said material storage processing tank is depressurized, and whereas
   the powdered or granular material stored in said hopper chamber is fed into said heating and drying chamber by its own weight for heat and dry processing, each time the powdered or granular material as finished heat and dry processing in said heating and drying chamber is discharged through said discharge port.

2. The drying and storing apparatus for powdered or granular material as set forth in claim 1, wherein said thermal conductive heating means further comprises an inner tube unit having a pillar body hung at the center of said outer tube unit, a second heater embedded in said pillar body, and a plurality of fins for conducting the heat of said second heater.

3. The drying and storing apparatus for powdered or granular material as set forth in claim 2, wherein said tube wall and said fins of said outer tube unit, and said pillar body and said fins of said inner tube unit are all made of a highly heat conductive metal.

4. The drying and storing apparatus for powdered or granular material as set forth in claim 2, 3 or 1, wherein
   a carrier gas introduction means by which a carrier gas is introduced into said material storage processing tank is further provided at said material storage processing tank, and
   a compression air supply source is connected to said main line and said transportation line and said circulation line have an electromagnetic valve, respectively, and wherein
   the powdered or granular material discharged through said discharge port is capable of being selectively supplied in said pneumatic transportation pipe or said circulation pipe by selectively controlling the open and close operation of said electromagnetic valve provided at said transportation line and said circulation line, respectively.

5. A feeding system of powdered or granular material comprising said drying and storing apparatus for powdered or granular material as set forth in claim 4, and
   a collector connected to the distal end of said pneumatic transportation pipe, wherein
   the powdered or granular material dried in said drying and storing apparatus is transported in said pneumatic transportation pipe by a compressed air introduced from said transportation line while being discharged through said discharge port when said electromagnetic valve provided for said transportation line is opened, and then is once collected in said collector, and thereafter is fed into said processing apparatus, wherein
   on the other hand when said electromagnetic valve provided for said circulation line is opened, powdered or granular material discharged through said discharge port is transported in said circulation pipe by a compressed air introduced from said circulation line and is introduced into the upper part in said hopper chamber, and wherein
   said carrier gas introduction means has a purge line which is further diverged from said main line and is connected around said discharge port and an electromagnetic valve provided for said purge line and is designed such that said compressed air as a carrier gas is introduced into said material storage processing tank from said purge line when said electromagnetic valve is opened.

6. The feeding system of powdered or granular material as set forth in claim 5, wherein said powdered or granular material is resin pellet and said processing apparatus of powdered or granular material is a resin molding machine.

7. The drying and storing apparatus for powdered or granular material as set forth in any one of claims 2, 3 or 1, wherein
   a compression air supply source is connected to said main line and said transportation line and said circulation line have an electromagnetic valve, respectively, and wherein
   the powdered or granular material discharged through said discharge port is capable of being selectively supplied in said pneumatic transportation pipe or said circulation pipe by selectively controlling the open and close operation of said electromagnetic valve provided at said transportation line and said circulation line, respectively.

8. A feeding system of powdered or granular material comprising said drying and storing apparatus for powdered or granular material as set forth in claim 7, and
   a collector connected to the distal end of said pneumatic transportation pipe, wherein
   the powdered or granular material dried in said drying and storing apparatus is transported in said pneumatic transportation pipe by a compressed air introduced from said transportation line while being discharged through said discharge port when said electromagnetic valve provided for said transportation line is opened, and then is once collected in said collector, and thereafter is fed into said processing apparatus, and wherein
   on the other hand when said electromagnetic valve provided for said circulation line is opened, powdered or granular material discharged through said discharge port is transported in said circulation pipe by a compressed air introduced from said circulation line and is introduced into the upper part in said hopper chamber.

9. The feeding system of powdered or granular material as set forth in claim 8, wherein said powdered or granular material is resin pellet and said processing apparatus of powdered or granular material is a resin molding machine.

10. The drying and storing apparatus for powdered or granular material as set forth in any one of claims 2, 3 or 1, wherein
    said hopper chamber has an opening at a part of the upper end and a charge hopper is further provided on the opening via a discharge valve, and wherein
    a powdered or granular material to be heated and dried is capable of being fed in said material storage processing tank by opening said discharge valve.

11. The drying and storing apparatus for powdered or granular material as set forth in claim 10, wherein
    a carrier gas introduction means by which a carrier gas is introduced into said material storage processing tank is further provided at said material storage processing tank, and
    a compression air supply source is connected to said main line and said transportation line and said circulation line have an electromagnetic valve, respectively, and wherein
    the powdered or granular material discharged through said discharge port is capable of being selectively supplied in said pneumatic transportation pipe or said circulation pipe by selectively controlling the open and close operation of said electromagnetic valve provided at said transportation line and said circulation line, respectively.

12. A feeding system of powdered or granular material comprising said drying and storing apparatus for powdered or granular material as set forth in claim 11, and
    a collector connected to the distal end of said pneumatic transportation pipe, wherein
    the powdered or granular material dried in said drying and storing apparatus is transported in said pneumatic transportation pipe by a compressed air introduced from said transportation line while being discharged through said discharge port when said electromagnetic valve provided for said transportation line is opened, and then is once collected in said collector, and thereafter is fed into said processing apparatus, wherein
    on the other hand when said electromagnetic valve provided for said circulation line is opened, the powdered or granular material discharged through said discharge port is transported in said circulation pipe by a compressed air introduced from said circulation line and is introduced into the upper part in said hopper chamber, and wherein
    said carrier gas introduction means has a purge line which is further diverged from said main line and is connected around said discharge port and an electromagnetic valve provided for said purge line and is designed such that said compressed air as a carrier gas is introduced into said material storage processing tank from said purge line when said electromagnetic valve is opened.

13. The feeding system of powdered or granular material as set forth in claim 12, wherein said powdered or granular material is resin pellet and said processing apparatus of powdered or granular material is a resin molding machine.

14. The drying and storing apparatus for powdered or granular material as set forth in any one of claims 2, 3 or 1, wherein
    said hopper chamber has an opening at its upper end and an open-close cover for air tightly closing the opening, and wherein
    a powdered or granular material to be heated and dried is capable of being fed in said material storage processing tank by opening said open-close cover.

15. The drying and storing apparatus for powdered or granular material as set forth in claim 14, wherein
    a carrier gas introduction means by which a carrier gas is introduced into said material storage processing tank is flitter provided at said material storage processing tank, and
    a compression air supply source is connected to said main line and said transportation line and said circulation line have an electromagnetic valve, respectively, and wherein
    the powdered or granular material discharged through said discharge port is capable of being selectively supplied in said pneumatic transportation pipe or said circulation pipe by selectively controlling the open and close operation of said electromagnetic valve provided at said transportation line and said circulation line, respectively.

16. A feeding system of powdered or granular material comprising said drying and storing apparatus for powdered or granular material as set forth in claim 15, and
    a collector connected to the distal end of said pneumatic transportation pipe, wherein
    the powdered or granular material dried in said drying and storing apparatus is transported in said pneumatic transportation pipe by a compressed air introduced from said transportation line while being discharged through said discharge port when said electromagnetic valve provided for said transportation line is opened, and then is once collected in said collector, and thereafter is fed into said processing apparatus, wherein
    on the other hand when said electromagnetic valve provided for said circulation line is opened, the powdered or granular material discharged through said discharge port is transported in said circulation pipe by a compressed air introduced from said circulation line and is introduced into the upper part in said hopper chamber, and wherein said carrier gas introduction means has a purge line which is further diverged from said main line and is connected around said discharge port and an electromagnetic valve provided for said purge line and is designed such that said compressed air as a carrier gas is introduced into said material storage processing tank from said purge line when said electromagnetic valve is opened.

17. The feeding system of powdered or granular material as set forth in claim 16, wherein said powdered or granular material is resin pellet and said processing apparatus of powdered or granular material is a resin molding machine.

18. The drying and storing apparatus for powdered or granular material as set forth in claim 2 or 3, wherein said pillar body has at its lower end a rectifier whose diameter is enlarged downwardly.

19. The drying and storing apparatus for powdered or granular material as set forth in claim 18, wherein a carrier gas introduction means by which a carrier gas is introduced into said material storage processing tank is further provided at said material storage processing tank, and a compression air supply source is connected to said main line and said transportation line and said circulation line have an electromagnetic valve, respectively, and wherein the powdered or granular material discharged through said discharge port is capable of being selectively supplied in said pneumatic transportation pipe or said circulation pipe by selectively controlling the open and close operation of said electromagnetic valve provided at said transportation line and said circulation line, respectively.

20. A feeding system of powdered or granular material comprising said drying and storing apparatus for powdered or granular material as set forth in claim 19, and a collector connected to the distal end of said pneumatic transportation pipe, wherein the powdered or granular material dried in said drying and storing apparatus is transported in said pneumatic transportation pipe by a compressed air introduced from said transportation line while being discharged through said discharge port when said electromagnetic valve provided for said transportation line is opened, and then is once collected in said collector, and thereafter is fed into said processing apparatus, wherein on the other hand when said electromagnetic valve provided for said circulation line is opened, the powdered or granular material discharged through said discharge port is transported in said circulation pipe by a compressed air introduced from said circulation line and is introduced into the upper part in said hopper chamber, and wherein said carrier gas introduction means has a purge line which is further diverged from said main line and is connected around said discharge port and an electromagnetic valve provided for said purge line and is designed such that said compressed air as a carrier gas is introduced into said material storage processing tank from said purge line when said electromagnetic valve is opened.

21. The feeding system of powdered or granular material as set forth in claim 20, wherein said powdered or granular material is resin pellet and said processing apparatus of powdered or granular material is a resin molding machine.

* * * * *